United States Patent
Banerjee

(10) Patent No.: US 9,705,923 B2
(45) Date of Patent: Jul. 11, 2017

(54) METHOD AND APPARATUS FOR AUTOMATING SECURITY PROVISIONING OF WORKLOADS

(71) Applicant: Symantec Corporation, Mountain View, CA (US)

(72) Inventor: Deb Banerjee, Mountain View, CA (US)

(73) Assignee: SYMANTEC CORPORATION, Mountain View, CA (US)

(*) Notice: Subject to any disclaimer, the term of this patent is extended or adjusted under 35 U.S.C. 154(b) by 113 days.

(21) Appl. No.: 14/474,477

(22) Filed: Sep. 2, 2014

(65) Prior Publication Data

US 2016/0065618 A1    Mar. 3, 2016

(51) Int. Cl.
G06F 21/00    (2013.01)
H04L 29/06    (2006.01)
G06F 9/455    (2006.01)
G06F 9/50     (2006.01)

(52) U.S. Cl.
CPC .............. *H04L 63/20* (2013.01); *G06F 9/455* (2013.01); *G06F 9/50* (2013.01); *G06F 2009/4557* (2013.01); *G06F 2009/45587* (2013.01)

(58) Field of Classification Search
CPC . H04L 63/20; G06F 9/455; G06F 2009/4557; G06F 2009/45587
See application file for complete search history.

(56) References Cited

U.S. PATENT DOCUMENTS

| 7,730,486 | B2 | 6/2010 | Herington |
| 8,549,513 | B2 | 10/2013 | Vinberg et al. |
| 9,047,136 | B2 | 6/2015 | Thanga et al. |
| 2008/0022285 | A1* | 1/2008 | Cherkasova ............ G06F 9/505 718/104 |
| 2011/0022870 | A1 | 1/2011 | McGrane et al. |
| 2011/0162069 | A1* | 6/2011 | Aupperle .............. G06F 21/552 726/22 |
| 2013/0185667 | A1* | 7/2013 | Harper ................ G06F 11/0709 715/772 |
| 2014/0237550 | A1 | 8/2014 | Anderson et al. |

OTHER PUBLICATIONS

International Search Report, PCT/US2015/047922, mailed Dec. 7, 2015.

* cited by examiner

*Primary Examiner* — Lisa Lewis
(74) *Attorney, Agent, or Firm* — Maschoff Brennan

(57) ABSTRACT

A method of automating security provisioning is provided. The method includes receiving a request to start a virtual application and determining an owner of the virtual application. The method includes determining a workload based on the virtual application, the workload including an application and a virtual machine and assigning the workload to a security container or sub-container, among a plurality of security containers, based on the owner of the virtual application.

20 Claims, 4 Drawing Sheets

METHOD AND APPARATUS FOR AUTOMATING SECURITY PROVISIONING OF WORKLOADS

BACKGROUND

Security containers are emerging as a common design pattern in SDN (software defined network) systems for applying security policies. A security container is an application and data container with associated security policies. Containers are commonly implemented as virtualized infrastructure with network segmentation using physical compute, networking and storage. Security policies define firewalls and anti-malware protection, among other security protections. Examples of security containers include Security Groups in VMware NSX and Endpoint Groups in Cisco Application Centric Infrastructure.

It is common in an SDN system to manually, i.e., administratively, define a security group with, for example, firewalls and anti-malware protection. Virtual applications, with applications and virtual machines, are then manually or administratively deployed as workloads into security groups. The process of manually or administratively deploying a virtual application into a security group is time-consuming and error-prone. Therefore, there is a need in the art for a solution which overcomes the drawbacks described above.

SUMMARY

In some embodiments, a method of automating security provisioning is provided. The method includes receiving a request to start a virtual application and determining an owner of the virtual application. The method includes determining a workload based on the virtual application, the workload including an application and a virtual machine. The workload is assigned to a security container or sub-container, among a plurality of security containers, based on the owner, such as a business unit, tenant, and sub groups of the business unit and tenant, of the virtual application across the different private and public clouds (such Vmware, OpenStack and AWS clouds) in use in an enterprise data center. At least one method step is performed by a processor.

In some embodiments, a tangible, non-transitory, computer-readable media having instructions thereupon which, when executed by a processor, cause the processor to perform a method is provide. The method includes determining an owner of a virtual application, responsive to a request to start the virtual application and determining a workload, having an application and a virtual machine, responsive to the request to start the virtual application. The method includes selecting a security container or a sub-container, from a plurality of security containers, in accordance with a security policy and based on the owner of the virtual application and assigning the workload to the selected security container or sub-container.

In some embodiments, a security provisioning system is provided. The security provisioning system includes a cloud management tool, configured to receive a direction to start a virtual application. The cloud management tool is configured to determine a workload including an application and a virtual machine, based on the virtual application, and is configured to determine an owner of the direction to start the virtual application. The system includes a cloud security orchestration system configured to assign the workload to one of a plurality of security containers or to a sub-container nested in the plurality of security containers, based on the owner of the direction to start the virtual application and based on a security policy, responsive to the direction to start the virtual application. Each of the cloud management tool and the cloud security orchestration system includes one of: a processor, a hardware module or a firmware module.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A security provisioning system performs automated security provisioning based on automated assignment of workloads to logical containers. The logical containers are security containers, and can be in multi-tenant clouds. Assignment of workloads to the security containers is based on management identities and roles. Automated security provisioning is performed by cloud management tools, which determine ownership of a virtual application, in cooperation with a cloud security orchestration system, which assigns a workload to a security container or sub-container, as described below with reference to FIGS. 1-4.

Figure 1:
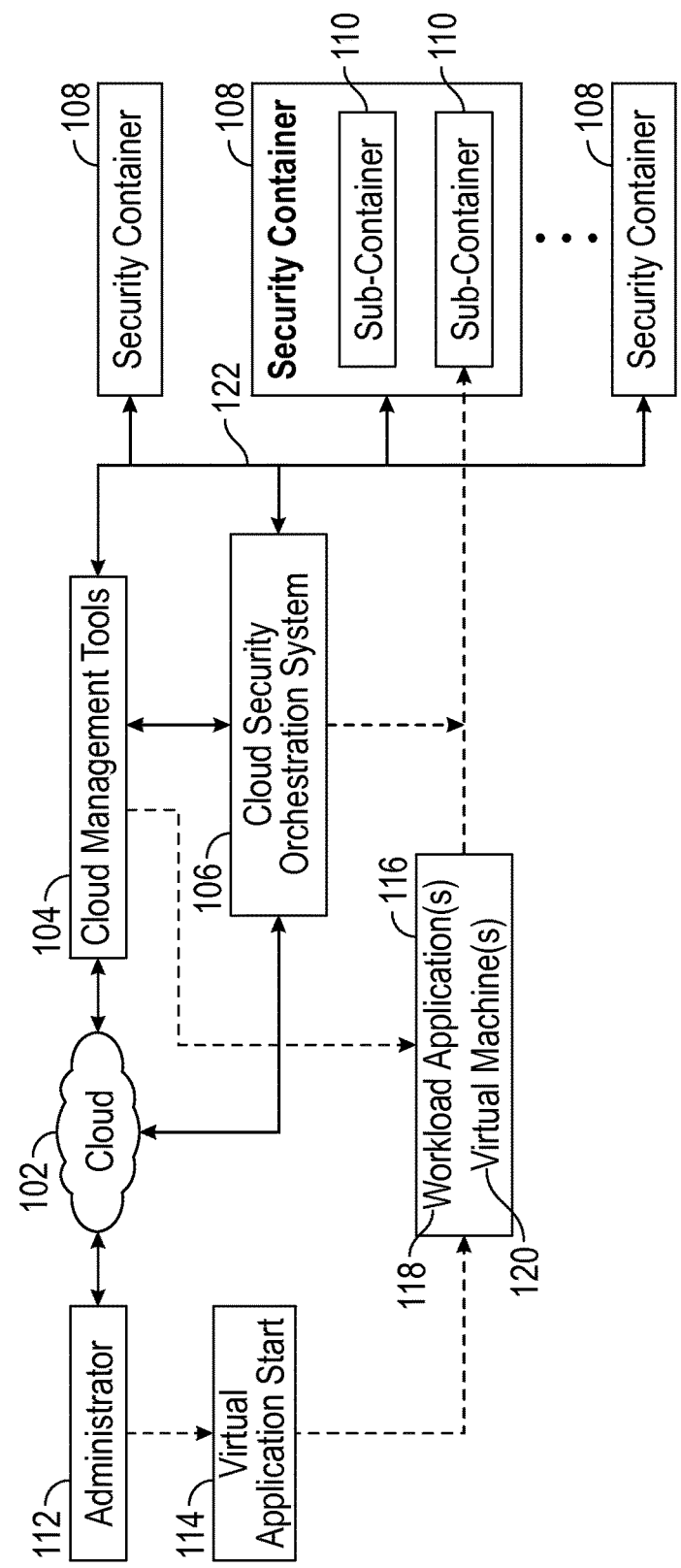
FIG. 1 is a security provisioning system and action diagram, illustrating assignment of a workload to a security container or sub-container, by a cloud security orchestration system cooperating with cloud management tools in accordance with some embodiments.

FIG. 1 is a security provisioning system and action diagram, illustrating assignment of a workload 116 to a security container 108 or sub-container 110, by a cloud security orchestration system 106 cooperating with cloud management tools 104. In various embodiments, cloud management tools 104, the cloud security orchestration system 106, and security containers 108 are coupled to the cloud 102, which can be a global communication network such as the Internet, or another network. In the embodiment shown in FIG. 1, the cloud management tools 104, cloud security orchestration system 106 and security containers 108 are coupled together by a network 122, which could be an intranet in an enterprise, an internet or other network coupling among enterprises, the cloud 102, or various other types of networks.

In an action example, depicted in FIG. 1, an administrator 112 requests or directs a virtual application start 114. The virtual application is to be implemented in a virtual computing environment using physical computing resources 214, which will be further described with reference to FIG. 2. The request or direction to start the virtual application is sent through the cloud 102 to or via the cloud management tools 104. That is, the request or direction is made using cloud management tools 104, and is sent through the cloud 102. Cloud management tools 104 are generally applied for launching or starting a virtual application, and can accept or deny a request to do so, and move the virtual application to appropriate resources. Examples of cloud management tools 104 include vCenter, vCAC for VMware, Horizon/Heat for OpenStack, AWS management Console, and other commercially available cloud management tools. Cloud management tools 104 are applied for managing resources in cloud applications and may determine a workload 116 for the virtual application indicated in the virtual application start 114. For example, the workload 116 includes one or more applications 118, embodied as data stores, and one or more virtual machines 120, also embodied as files. As a further example, the workload 116 could be embodied as a single file.

Still referring to FIG. 1, the cloud management tools 104 and the cloud security orchestration system 106 communicate with each other. In one embodiment, the cloud management tools 104 determine the owner of the virtual application indicated in the virtual application start 114, and communicate information regarding the owner to the cloud security orchestration system 106. For example, the cloud management tools 104 could determine and pass to the cloud security orchestration system 106 a user ID (identification, e.g., a logon ID) or an IP (Internet Protocol) address of the owner of the virtual application (e.g., the IP address from whence the virtual application start 114 issues). Management proxies intercepting management traffic into compute nodes (e.g., ESXi in VMware, Nova in OpenStack) can identify the specific management operation, and the identity being used to execute that operation. The operation could be a vApp (virtual application) start operation, for example. Organization roles for an administrator can be extracted from a user ID or logon ID (e.g., System Administrator for the human relations department of a business unit, Web Administrator for the human relations division or group of a business unit, System Administrator for engineering, or Administrator for a finances unit). In some embodiments, the organization roles can be obtained by looking at end user access patterns of files and storage objects in the virtual workload, where ownership can be inferred using products such as Data Insight, and these can be applied to determine ownership of the application. The cloud security orchestration system 106 can detect that workloads event from the cloud management tools 104, and use the identity information to assign the workloads 116 into an appropriate security container 108 (e.g., a web sub-container 110 in the human resources parent container in VMware NSX). By deploying the workload 116 into the selected security container 108, the workload 116 inherits the corresponding threat detection, vulnerability management and network segmentation policies employed by a software defined network. Such actions could be performed on a demand basis, triggered by the virtual application start 114, or based on polling, interrupts or other mechanisms readily determined in accordance with the teachings herein.

Continuing with FIG. 1, the security containers 108 can be grouped in various manners, and can be in one facility or multiple facilities, e.g., as cloud storage. For example, the security containers 108 could be organized as multi-tenant storage memory, with one or more security containers 108 dedicated to each of a plurality of tenants. Each of the security containers 108 has one or more security policies. That is, one or more security policies are assigned to or associated with each of the security containers 108 and/or each of the sub-containers 110. Sub-containers 110 can be nested within security containers 108 to various depths, e.g., nesting within nesting, etc. The security policies govern security protections provided or applied to the security containers 108, sub-containers 110, and data contained therein (e.g., one or more workloads 116 in each security container 108 or sub-container 110).

In order to determine to which security container 108 or sub-container 110 to assign the workload 116, the cloud security orchestration system 106 applies rules, which will be further discussed with reference to FIG. 2. Referring back to FIG. 1, based on the owner of the virtual application, the cloud security orchestration system 106 determines a security container 108 or sub-container 110, and assigns the workload 116 to the security container 108 or sub-container 110. The workload 116 is then deployed to the security container 108 or sub-container 110, i.e., the files embodying the application(s) 118 and virtual machine(s) 120 are written to the selected security container 108 or sub-container 110. The workload 116 inherits the security policy or policies and associated security protection of that security container 108 or sub-container 110. In this manner, the cloud security orchestration system 106 automates security provisioning of the virtual application, based on the owner of the virtual application.

Figure 2:
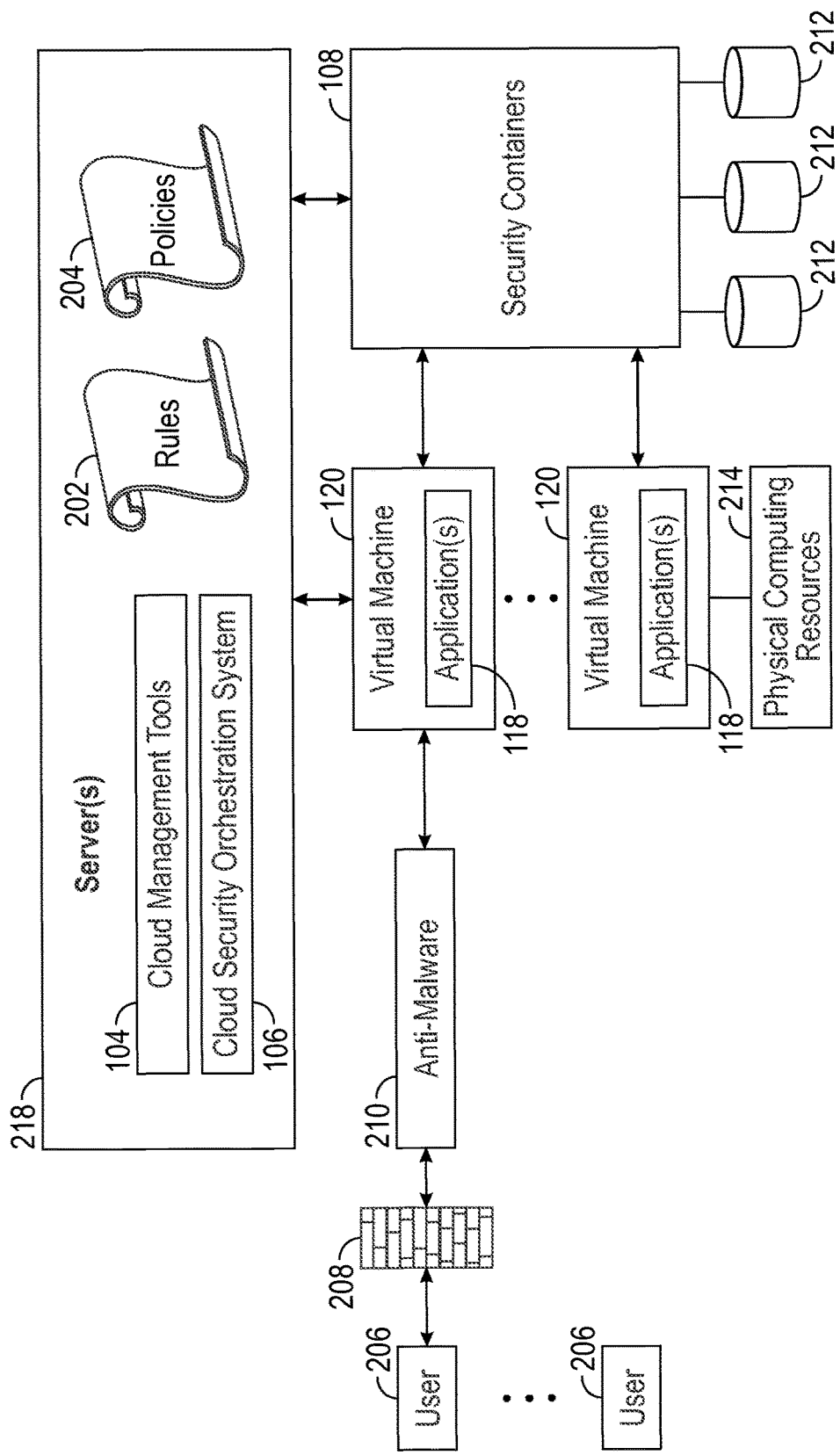
FIG. 2 is a system diagram, illustrating virtual machines coupled to security containers, implemented using physical computing resources and storage memory in accordance with some embodiments.

FIG. 2 is a system diagram, illustrating virtual machines 120 coupled to security containers 108, implemented using physical computing resources 214 and storage memory 212. Security protection is applied according to rules 202 and policies 204 that guide assignment of workloads 116 to security containers 108 or sub-containers 110. Cloud management tools 104 and cloud security orchestration system 106 can be embodied as software modules executing on one or more servers 218, or hardware or firmware modules included in or coupled to the server(s) 218, or combinations thereof. The rules 202 and policies 204 can be embodied as lists, tables, databases, software code or other data structures stored in memory in or coupled to the server(s) 218, or hardware or firmware in or coupled to the server(s) 218, or combinations thereof. The security containers 108 can be embodied as virtual storage implemented with storage memories 212. The virtual machines 120 can be embodied as physical computing resources 214 assigned to each virtual machine 120, as is common in virtual computing technology. For example, the physical computing resources 214 could include servers, processors, local memory, network switches or routers, any or all of which can be allocated to form virtual machines 120. Each of the virtual machines 120 in FIG. 2 is shown with one or more applications 118 operating thereupon, in accordance with the workloads 116 and the corresponding virtual application starts 114. Users 206 can access and interact with virtual machines 120 and applications 118 in the embodiment shown in FIG. 2. One of the virtual machines 120 is shown with a firewall 208 and anti-malware 210 as security protection, in accordance with the security policy 204 of an associated security container 108 or sub-container 110. For example, a user 206 communicates with the virtual machine 120 through a firewall 208, and anti-malware 210 (e.g., various types of security protection software) monitors the communication and intercepts malware (e.g., virus, hacker attack).

The security policies 204 indicate which security containers 108 and sub-containers 110 are protected by which security protection in some embodiments. As discussed above, security protection can include firewalls 208, anti-malware 210 of various types, and further security protection as known in the art, in various combinations. The rules 202 direct assignment of a workload 116 to a security container 108 or sub-container 110, according to security policies 204, based on aspects of the owner of the virtual application that is requested in the virtual application start 114 and represented in the workload 116. These aspects could include to which organization or to which portion of an organization the owner of the virtual application belongs, which role the owner has within an organization, or other aspects of ownership. Some or all of the rules 202 could be tenant-specific. For example, a rule 202 could specify that an owner belonging to human resources of a business unit (HR BU) should have a workload 116 protected by a first range of security protection, which is assigned to a first security container 108 or sub-container 110. A rule 202 could specify that applications originating from an owner who is employed by or represents a particular tenant should have workloads 116 protected by a second range of security protection, which is assigned to a second security container 108 or group of security containers 108. A rule 202 could specify one or more conditions as to organization and/or role, and/or one or more exceptions, and indicate which combinations of conditions and exceptions point to which policy 204 or which security container 108 or sub-container 110. Workloads 116 from virtual application starts 114 of FIG. 1 belonging to an owner that meets conditions and does not have exceptions as specified in a rule 202 would then get assigned to a security container 108 or sub-container 110 that has one or more policies 204, specified according to the rule 202. In various embodiments, the rules 202 could specify policies, and another table or other data structure could specify which security containers 108 or sub-containers 110 have which policies 204. Alternatively, the rules 202 could directly specify security containers 108 or sub-containers 110. The cloud security orchestration system 106 would then access either the rules 202 which specify the security containers 108 and/or sub-containers 110 directly in some embodiments. The cloud security orchestration system 106 may access the rules 202 and the policies 204 or the list of policies and containers to determine the security containers 108 and/or sub-containers 110 accordingly. Variations of the above are readily determined in accordance with the teachings herein. Selection of a security container 108 or sub-container 110 based on the owner of a virtual application thus has various embodiments of the rules 202 and the policies 204. Selection based on the owner could include selection by tenant, organization and/or role, among other possibilities.

Referring to FIGS. 1 and 2, once the virtual application, embodied as a workload 116 with one or more applications 118 in one or more virtual machines 120, is deployed into the selected security container 108 or sub-container 110, the physical computing resources 214 for the one or more virtual machines 120 are allocated. This allocation can be performed by the cloud management tools 104 and/or other virtual computing components. Security, for example the firewall 208 and anti-malware 210 as described above, is set up according to the policy or policies 204 of the selected security container 108 or sub-container 110. The one or more applications 118 are installed into the virtual machine 120 and can execute in the memory of the virtual machine 120 (i.e., execute using the physical computing resources 214 assigned to the virtual machine 120) as the application 118 is activated. The virtual application requested or directed in the virtual application start 114 (see FIG. 1) is created, automatically provisioned with security based on the ownership of the virtual application, and activated.

Figure 3:
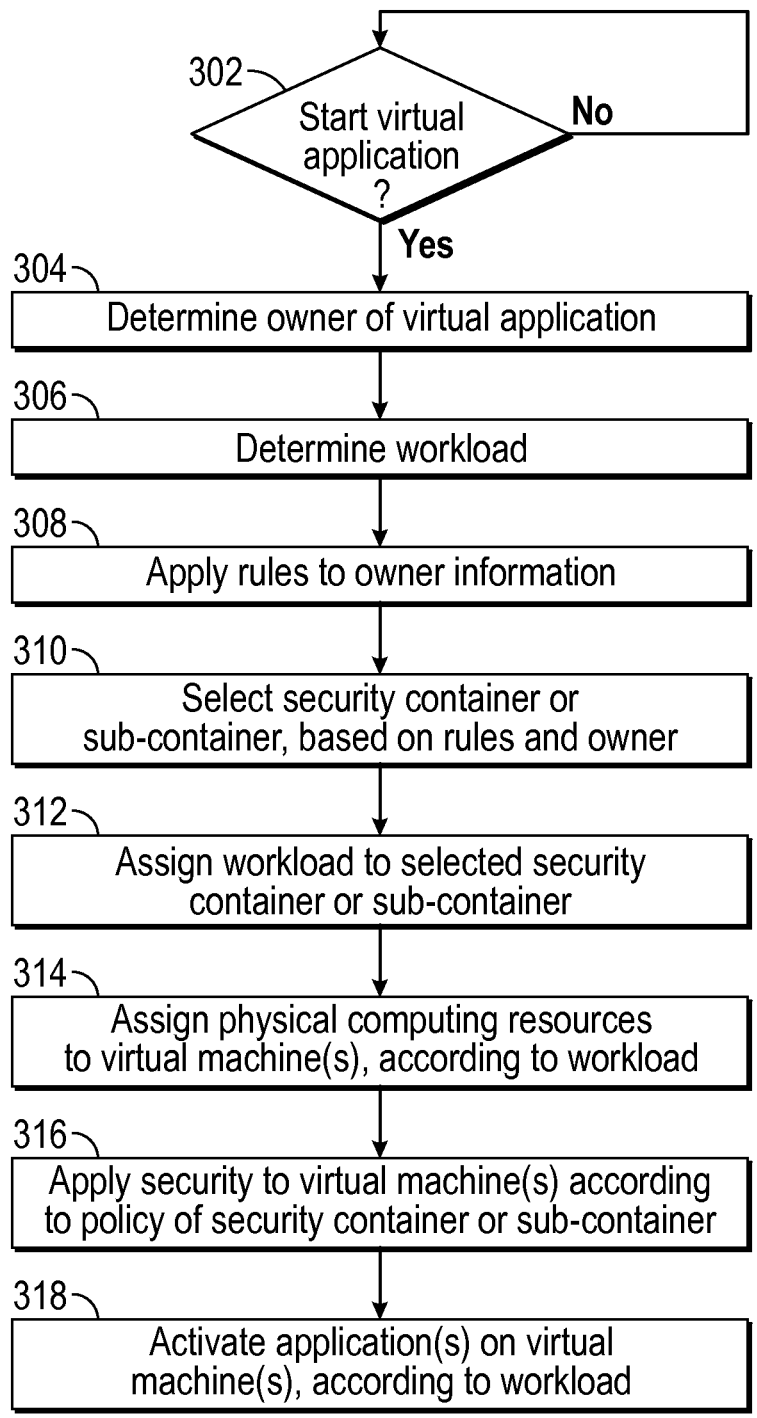
FIG. 3 is a flow diagram, showing a method of automating security provisioning, which can be practiced on or by embodiments shown in FIGS. 1 and 2.

FIG. 3 is a flow diagram, showing a method of automating security provisioning, which can be practiced on or by embodiments shown in FIGS. 1 and 2. Some or all of the actions of the method or variations thereof can be performed by a processor, such as a processor in a cloud management environment or a virtual computing environment, more specifically a processor operating cloud management tools and/or a cloud security orchestration system. In a decision action 302, it is determined whether to start a virtual application. If the answer is no, there is no virtual application start, flow loops back to the decision action 302. In further embodiments, this operation could branch elsewhere, and return in response to detection of a virtual application start. If the answer is yes, there is a virtual application start, flow continues to the action 304. The owner of the virtual application is determined, in the action 304. This can be based on an IP address or a user ID, as discussed above with reference to FIGS. 1 and 2. A workload is determined, in an action 306. The workload is based on the request or direction to start the virtual application, and includes one or more applications and one or more virtual machines. Rules are applied to the owner information, in an action 308. The rules specify aspects of ownership and indicate policies or security containers or sub-containers based on the aspects of ownership of the virtual application. A security container or sub-container is selected, based on the rules and the owner (i.e., the owner information), in an action 310.

The workload is assigned to the selected security container or sub-container in action 312 of FIG. 3. In some embodiments, the workload is assigned based on the owner, such as a business unit, tenant, and sub groups of the business unit and tenant, of the virtual application across the different private and public clouds (such Vmware, OpenStack and AWS clouds) in use in an enterprise data center. Action 312 includes writing files embodying the application(s) and virtual machine(s) into the selected security container or sub-container. Physical computing resources are assigned to the virtual machine(s), according to the workload in an action 314. Action 314 can be performed in a virtual computing environment. Security is applied to the virtual machine(s) according to the policy (or policies) of the selected security container or sub-container, in an action 316. The applied security can include a firewall, anti-malware, threat detection, vulnerability management, and/or network segmentation etc. The application(s) are activated on the virtual machine(s), according to the workload, in an action 318.

Figure 4:
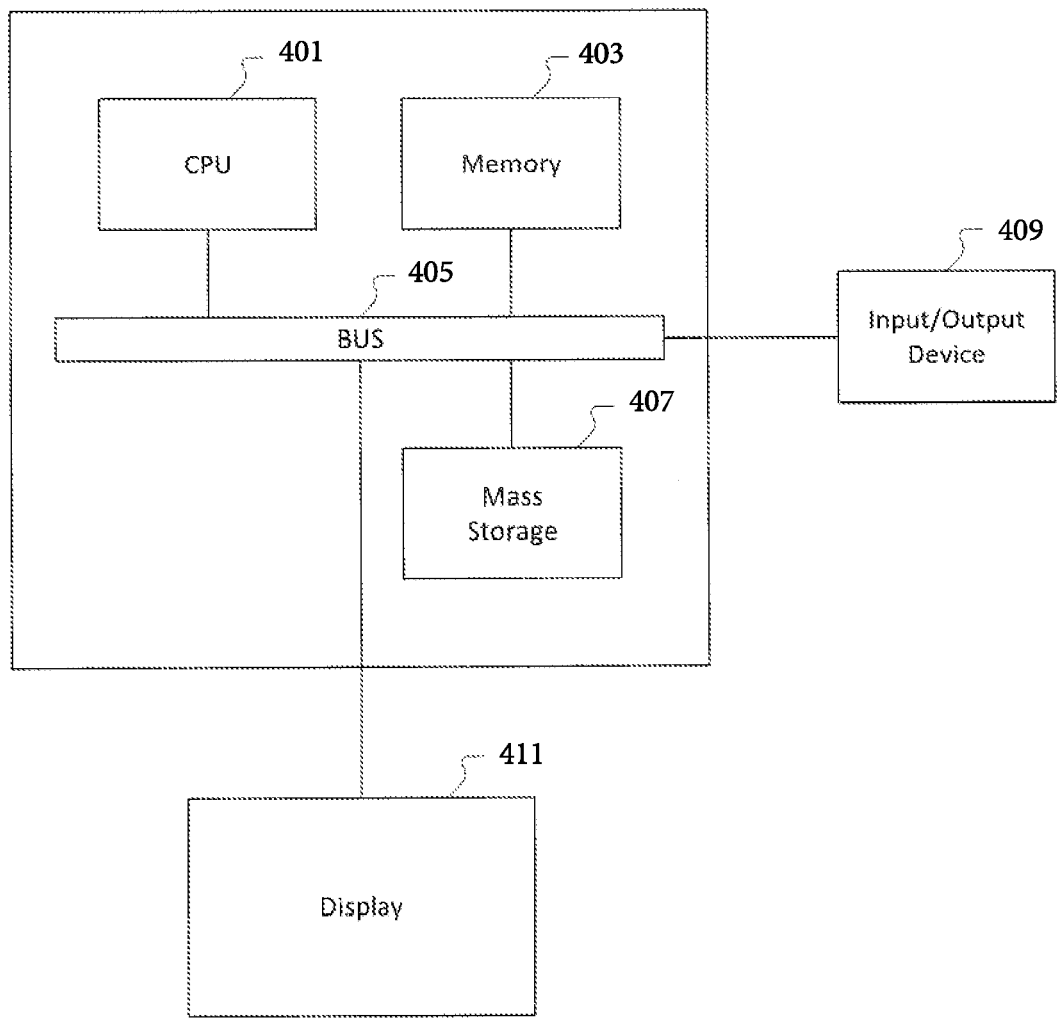
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for automating security provisioning based on assignment of a workload to a security container or sub-container in accordance with some embodiments. The computing device includes a central processing unit (CPU) 401, which is coupled through a bus 405 to a memory 403, and mass storage device 407. Mass storage device 407 represents a persistent data storage device such as a floppy disc drive or a fixed disc drive, which may be local or remote in some embodiments. The mass storage device 407 could implement a backup storage, in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1-3. The code embodying this functionality may be stored within memory 403 or mass storage device 407 for execution by a processor such as CPU 401 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of automating security provisioning in a virtual computing environment, performed by one or more servers executing instructions in tangible memory, comprising:
   receiving a request to start a virtual application by a cloud management tool;
   determining an owner of the virtual application by the cloud management tool;
   communicating the owner to a cloud security orchestrating system;
   determining a workload based on the virtual application using the cloud security orchestrating system, the workload including an application and a virtual machine; and
   assigning the workload to a security container or sub-container, among a plurality of security containers using the cloud security orchestrating system to automatically define a security group within a software defined network (SDN) system, based on the owner of the virtual application.

2. The method of claim 1, wherein:
   the application and the virtual machine are embodied in at least one file; and
   assigning the workload to the security container or sub-container includes writing the at least one file to the security container or sub-container.

3. The method of claim 1, wherein the security container or sub-container is configured to contain a plurality of workloads according to one or more security policies.

4. The method of claim 1, wherein:
   determining the owner of the virtual application includes determining membership of the owner according to an organization; and
   the security container or sub-container has a security policy that specifies one of: a firewall or anti-malware protection.

5. The method of claim 1, further comprising:
   accessing a set of rules, each rule of the set of rules specifying an ownership condition and one of: a security policy, a security container having the security policy attached thereto, or a sub-container having the security policy attached thereto, wherein assigning the workload to the security container is further based on the set of rules.

6. The method of claim 1, wherein the owner is determined based upon an IP (Internet Protocol) address.

7. The method of claim 1, wherein the owner is determined based upon a logon ID (identification).

8. A tangible, non-transitory, computer-readable media having instructions thereupon which, when executed by a processor, cause the processor to perform a method for automating security provisioning in a virtual computing environment comprising:
   determining an owner of a virtual application, responsive to a request to start the virtual application by a cloud management tool;
   determining a workload, having an application and a virtual machine by the cloud management tool, responsive to the request to start the virtual application;
   communicating the owner to a cloud security orchestrating system;
   selecting a security container or a sub-container, from a plurality of security containers, in accordance with a security policy and based on the owner of the virtual application using the cloud security orchestrating system; and
   assigning the workload to the selected security container or sub-container using the cloud security orchestrating system to automatically define a security group within a software defined network (SDN) system.

9. The computer-readable media of claim 8, wherein the method further comprises:
   determining to which organization or portion of an organization the owner belongs, wherein selecting the security container or sub-container is based on the organization or the portion of the organization to which the owner belongs.

10. The computer-readable media of claim 8, wherein the method further comprises:
    applying a plurality of rules to information based on the owner of the virtual application, wherein selecting the security container or sub-container is based on a result of applying the plurality of rules, and wherein each of the plurality of rules indicates one of the plurality of security containers or one of a plurality of sub-containers as a destination for workloads from a specified organization or portion of the organization.

11. The computer-readable media of claim 8, wherein:
determining the owner of the virtual application is based on a logon ID (identification) or an IP (Internet Protocol) address associated with the request to start the virtual application; and
assigning the workload to the selected security container or sub-container includes writing at least one file embodying the application and the virtual machine to the selected security container or sub-container.

12. The computer-readable media of claim 8, wherein the method further comprises:
associating each of the plurality of security containers with one of a plurality of security policies.

13. The computer-readable media of claim 8, wherein selecting the security container is further based on a role of the owner relative to an organization to which the owner belongs.

14. A security provisioning system, comprising one or more servers configured to perform a method by executing instructions in tangible memory, the method comprises:
receiving a request to start a virtual application by a cloud management tool;
determining an owner of the virtual application by the cloud management tool;
communicating the owner to a cloud security orchestrating system;
determining a workload based on the virtual application using the cloud security orchestrating system, the workload including an application and a virtual machine; and
assigning the workload to a security container or sub-container, among a plurality of security containers using the cloud security orchestrating system to automatically define a security group within a software defined network (SDN) system, based on the owner of the virtual application.

15. The security provisioning system of claim 14, wherein:
the application and the virtual machine are embodied in at least one file; and
assigning the workload to the security container or sub-container includes writing the at least one file to the security container or sub-container.

16. The security provisioning system of claim 14, wherein the security container or sub-container is configured to contain a plurality of workloads according to one or more security policies.

17. The security provisioning system of claim 14, wherein:
determining the owner of the virtual application includes determining membership of the owner according to an organization; and
the security container or sub-container has a security policy that specifies one of: a firewall or anti-malware protection.

18. The security provisioning system of claim 14, wherein the method further comprises:
accessing a set of rules, each rule of the set of rules specifying an ownership condition and one of: a security policy, a security container having the security policy attached thereto, or a sub-container having the security policy attached thereto, wherein assigning the workload to the security container is further based on the set of rules.

19. The security provisioning system of claim 14, wherein determining the owner comprises determining the owner based upon an IP (Internet Protocol) address.

20. The security provisioning system of claim 14, wherein determining the owner comprises determining the owner based upon a logon ID (identification).

* * * * *